United States Patent
Johnston

(10) Patent No.: US 12,025,180 B2
(45) Date of Patent: Jul. 2, 2024

(54) CONTROLLED TORQUE BUSHING WITH SHOULDERED TWO-PIECE INNER SLEEVE

(71) Applicant: The Pullman Company, Milan, OH (US)

(72) Inventor: Brent D. Johnston, Lake Forest, IL (US)

(73) Assignee: The Pullman Company, Milan, OH (US)

( * ) Notice: Subject to any disclaimer, the term of this patent is extended or adjusted under 35 U.S.C. 154(b) by 759 days.

(21) Appl. No.: 17/156,340

(22) Filed: Jan. 22, 2021

(65) Prior Publication Data

US 2022/0235817 A1   Jul. 28, 2022

(51) Int. Cl.
| | |
|---|---|
| F16C 17/10 | (2006.01) |
| F16F 1/38 | (2006.01) |
| B60G 7/04 | (2006.01) |
| F16F 1/393 | (2006.01) |

(52) U.S. Cl.
CPC .......... *F16C 17/10* (2013.01); *F16F 1/3842* (2013.01); *B60G 7/04* (2013.01); *B60G 2204/41* (2013.01); *F16F 1/3863* (2013.01); *F16F 1/393* (2013.01)

(58) Field of Classification Search
None
See application file for complete search history.

(56) References Cited

U.S. PATENT DOCUMENTS

| | | | |
|---|---|---|---|
| 5,181,784 A | 1/1993 | Joerdens et al. | |
| 8,037,573 B2 | 10/2011 | Bost, Jr. | |
| 10,508,701 B2 | 12/2019 | Cerri, III | |
| 2011/0116731 A1 | 5/2011 | McLaughlin | |
| 2019/0128320 A1* | 5/2019 | Cox | F16C 33/106 |

FOREIGN PATENT DOCUMENTS

| | | | |
|---|---|---|---|
| CN | 208651428 | 3/2019 | |
| DE | 102011013678 | 9/2016 | |
| EP | 1245415 B1 * | 1/2007 | ............... B60G 7/02 |
| GB | 466354 A * | 5/1937 | |
| GB | 1206895 | 9/1970 | |

* cited by examiner

*Primary Examiner* — Melanie Torres Williams
(74) *Attorney, Agent, or Firm* — Burris Law, PLLC

(57) ABSTRACT

A bushing assembly includes an inner sleeve, a bearing, an elastomeric bushing, and an outer sleeve. The inner sleeve includes two pieces. Each of the two pieces includes a distal end portion and a proximal end portion. Each of the proximal end portions includes an external shoulder having an outer radial face and an inner axial face. The bearing is rotationally mounted around the inner sleeve and captured between each of the inner axial faces of the external shoulders. The elastomeric bushing is disposed around the bearing and abutting the outer radial faces of the external shoulders. The outer sleeve is disposed around the elastomeric bushing and extending at least partially over the external shoulders.

19 Claims, 5 Drawing Sheets

CONTROLLED TORQUE BUSHING WITH SHOULDERED TWO-PIECE INNER SLEEVE

FIELD

The present disclosure relates to bushing assemblies and more particularly to elastomeric bushing assemblies for securing components of a vehicle suspension system.

BACKGROUND

The statements in this section merely provide background information related to the present disclosure and may not constitute prior art.

Elastomeric bushing assemblies have been used in vehicles, particularly in suspension systems that are disposed between a body of the vehicle and a chassis. As the vehicle travels, the body of the vehicle moves relative to the chassis. The relative movement between the body of the vehicle and the chassis is accommodated by various resilient devices of the suspension system disposed therebetween. The flexing of the resilient device may cause a pivoting motion of the resilient devices relative to the components of the body of the vehicle. The elastomeric bushing assemblies are used to connect the resilient devices to the components of the body of the vehicle to facilitate the pivotal motion of the resilient devices relative to the component of the body of the vehicle, thereby absorbing shock applied to the body of the vehicle.

An elastomeric bushing assembly typically includes an inner metal sleeve, a bearing, an elastomer layer, and an outer metal housing arranged in this order from inside to outside in the radial direction. The bearing is mounted around the inner metal sleeve and the axial movement of the bearing relative to the inner metal housing is restrained. In one known design, the inner metal sleeve includes a raised barrel section at one longitudinal end of the inner metal sleeve. After the bearing is mounted around the inner metal sleeve from the other longitudinal end, a retaining ferrule or a retaining ring is affixed to the other longitudinal end such that the bearing is disposed around the inner metal sleeve and between the raised barrel and the retaining ferrule/ring. The axial movement of the bearing is limited by the raised barrel section and the retaining ferrule/ring at longitudinal ends of the inner metal housing. Other known designs include a straight inner metal sleeve without raised barrels and retaining rings on both ends. Assembling a typical elastomeric bushing having these structures is time-consuming and complicated due to affixing the retaining ferrule/ring after the bearing is mounted.

These issues related to the assembly of elastomeric bushings, among other issues related to bushings for use in vehicle suspensions, are addressed by the present disclosure.

SUMMARY

This section provides a general summary of the disclosure and is not a comprehensive disclosure of its full scope or all of its features.

In one form, a bushing assembly is provided, which includes an inner sleeve, a bearing, an elastomeric bushing, and an outer sleeve. The inner sleeve includes two pieces. Each of the two pieces includes a distal end portion and a proximal end portion. Each of the proximal end portions includes an external shoulder having an outer radial face and an inner axial face. The bearing is rotationally mounted around the inner sleeve and captured between each of the inner axial faces of the external shoulders. The elastomeric bushing is disposed around the bearing and abutting the outer radial faces of the external shoulders. The outer sleeve is disposed around the elastomeric bushing and extends at least partially over the external shoulders.

In other features, which may be implemented individually or in any combination, the elastomeric bushing abuts the inner axial faces of the external shoulders and includes beads proximate the inner axial faces of the external shoulders and/or the outer radial faces of the external shoulders. Each of the two pieces of the inner sleeve may be symmetrical or asymmetrical and may include a locking feature for securing the two pieces together. One of the two pieces of the inner sleeve includes an axial tab at its distal end portion and the other piece of the inner sleeve includes an axial recess at its distal end portion. The axial tab is press fit into the axial recess to form the locking feature. The external shoulders each define a width, wherein at least one of the outer diameters and the widths of the external shoulders are sized to radially and/or conically tune the elastomeric bushing.

In another form, a bushing assembly is provided, which includes an inner sleeve, a bearing, an elastomeric bushing, and an outer sleeve. The inner sleeve consists of two pieces. Each of the two pieces includes a distal end portion and a proximal end portion. Each of the proximal end portions includes an external shoulder having an outer radial face and an inner axial face. The bearing is rotationally mounted around the inner sleeve and captured between each of the inner axial faces of the external shoulders. The elastomeric bushing is disposed around the bearing and abuts the outer radial faces and the inner axial faces of the external shoulders. The outer sleeve is disposed around the elastomeric bushing and extends at least partially over the external shoulders.

In still another form, a bushing assembly is provided, which includes an inner sleeve, a bearing, an elastomeric bushing, and an outer sleeve. The inner sleeve includes two pieces. Each of the two pieces includes a distal end portion and a proximal end portion. Each of the proximal end portions includes an external shoulder having an outer radial face and an inner axial face. The bearing is rotationally mounted around the inner sleeve and captured between each of the inner axial faces of the external shoulders. The elastomeric bushing is disposed around the bearing and abuts the outer radial faces and the inner axial faces of the external shoulders. The outer sleeve is disposed around the elastomeric bushing and extending at least partially over the external shoulders.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
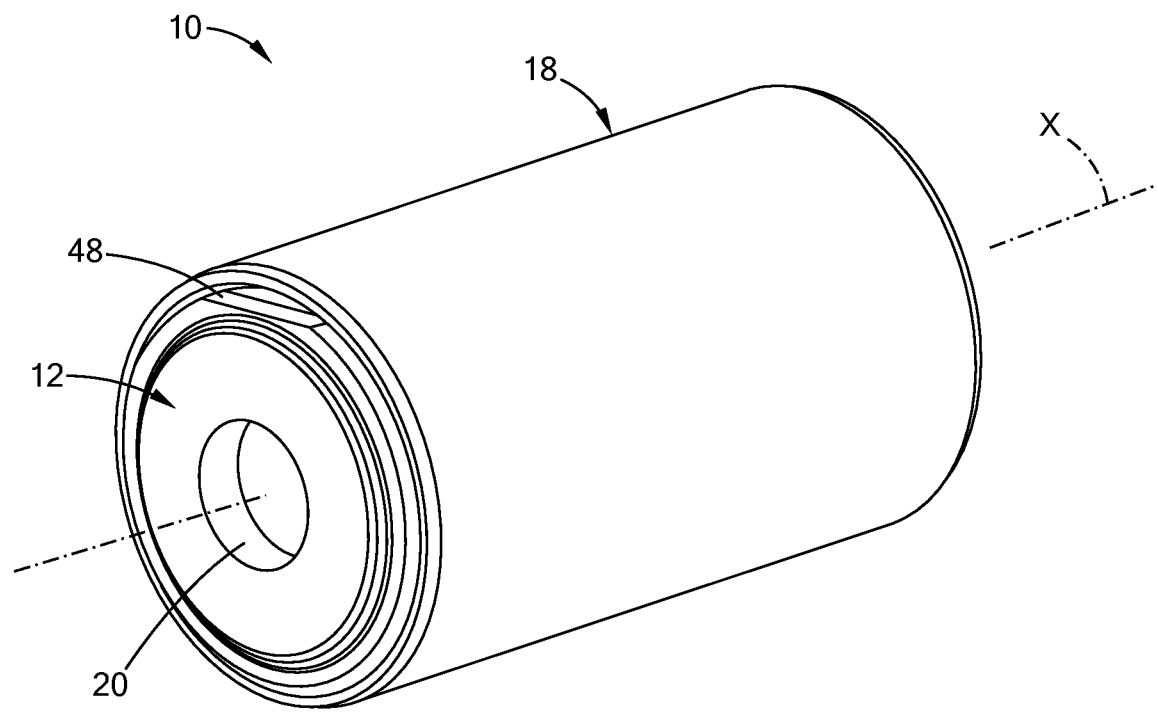
FIG. 1 is a perspective view of a bushing assembly constructed in accordance with the teachings of the present disclosure.
Figure 2:
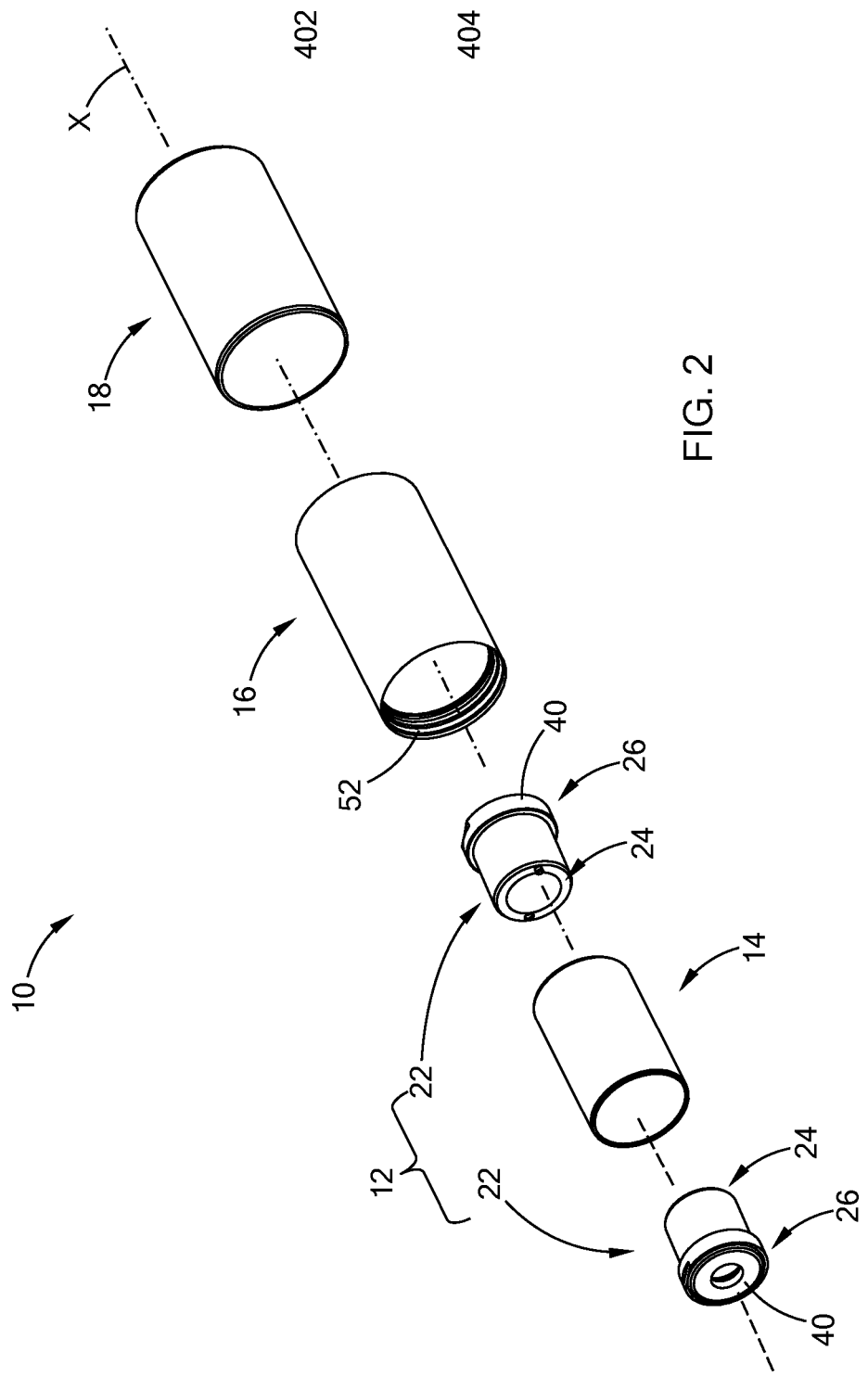
FIG. 2 is an exploded view of the bushing assembly of FIG. 1.
Figure 3:
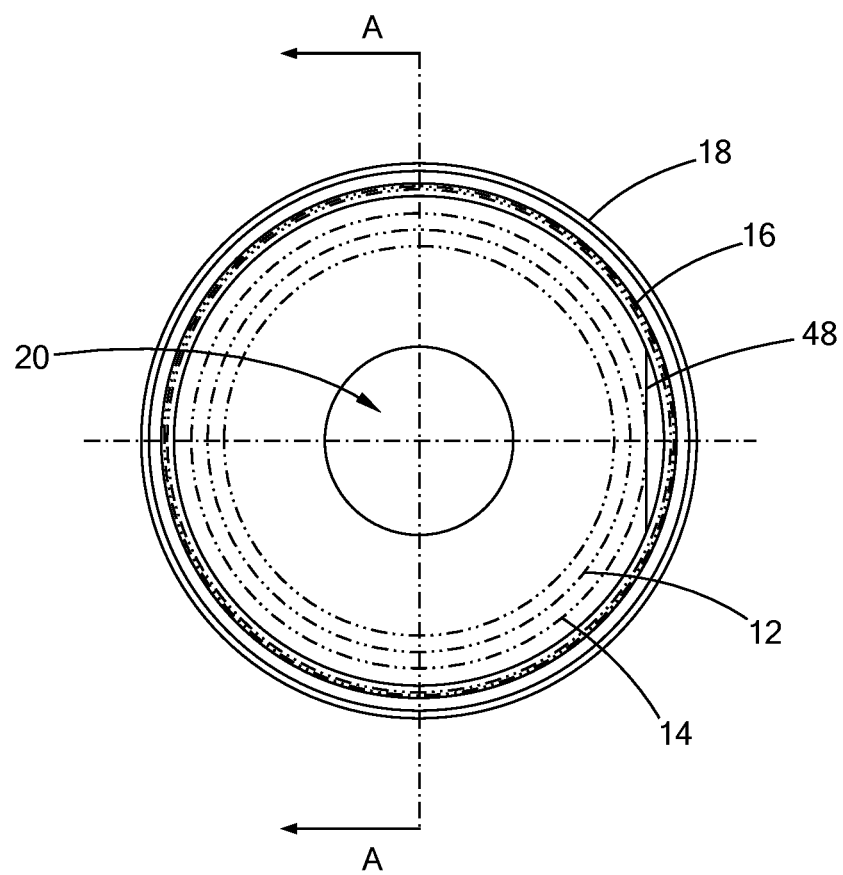
FIG. 3 is an end view of the bushing assembly of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 4, a bushing assembly 10 constructed in accordance with the teachings of the present disclosure includes an inner sleeve 12 having a two-piece structure, a bearing 14 rotationally mounted around the inner sleeve 12, an elastomeric bushing 16 disposed around the bearing 14, and an outer sleeve 18 disposed around the elastomeric bushing 16. The inner sleeve 12, the bearing 14, the elastomeric bushing 16, and the outer sleeve 18 are coaxially arranged around a central axis X of the bushing assembly 10. The inner sleeve 12 defines a central bore 20. A first component (not shown), such as a resilient device of a suspension system, may be connected to a second component (not shown), such as a component of a body of a vehicle by the bushing assembly 10. (Such a suspension system and components are illustrated in greater detail in U.S. Pat. No. 10,508,701 titled "Vehicle Suspension Bushing Assembly and Method of Assembling the Same," which is commonly owned with the present application and the contents of which are incorporated herein by reference in their entirety). By inserting a fastener (not shown) of the first component into the central bore 20 of the inner sleeve 12 and by mounting the second component around the outer sleeve 18, the first component is connected to the second component. The bearing 14 of the bushing assembly 10 allows the first component to have a pivoting motion relative to the second component. The elastomeric bushing 16 of the bushing assembly 10 allows a limited translational movement between the first and second components.

The inner sleeve 12 includes two pieces 22, each having an inner end portion 24 (i.e., a distal end portion) and an outer end portion 26 (i.e., a proximal end portion) opposing the inner end portion 24 along the central axis X. The inner end portions 24 of the pieces 22 may be provided with one or more locking feature(s) 30 that connects the two pieces 22 together, one form of which is described in greater detail below.

Figure 4:
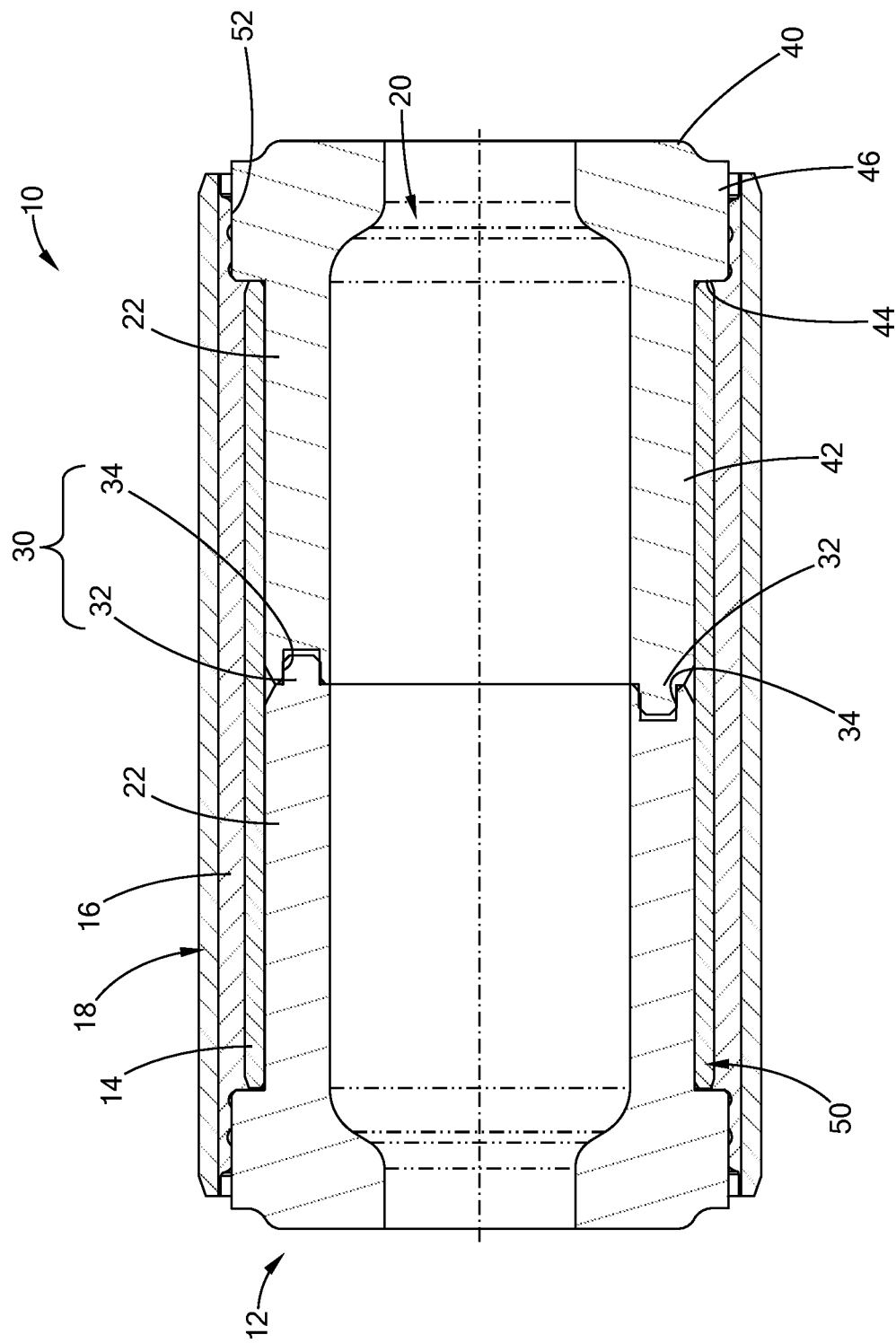
FIG. 4 is a cross-sectional view of the bushing assembly, taken along line A-A of FIG. 3.
Figure 5:
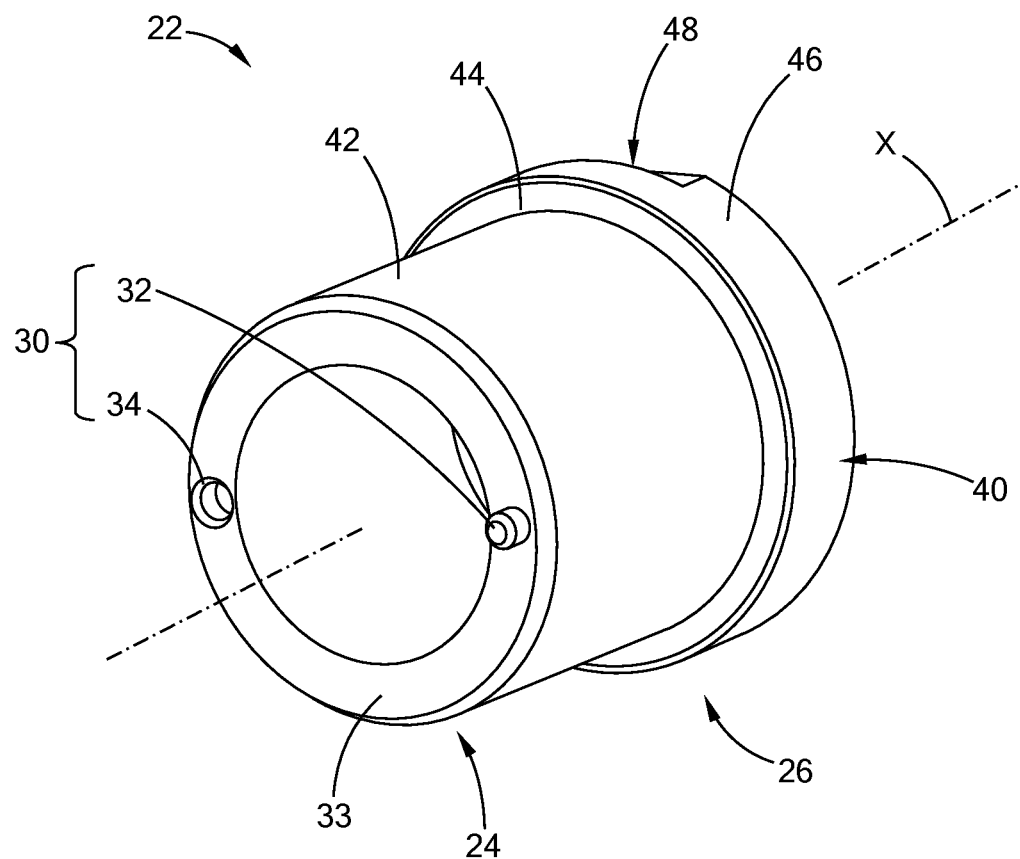
FIG. 5 is a perspective view of one piece of a two piece inner sleeve of the bushing assembly of FIG. 1.

Referring more specifically to FIGS. 4 and 5, as an example, the locking feature 30 may include a pair of locking tabs 32 and a pair of axial recesses 34, which may be axial grooves, for receiving the corresponding locking tabs 32 therein. In this form, the locking tabs 32 and the axial recesses 34 extend in an axial direction as shown. The locking tabs 32 protrude from an end surface 33 of the pieces 22. The axial recesses 34 are recessed from the end surface 33 of the pieces 22. In one form, each of the pieces 22 is provided with one of the locking tabs 32 and one of the axial recesses 34. In another form, the pair of locking tabs 32 may be provided at the same piece 22, while the pair of the axial recesses 34 may be provided at another adjacent piece 22. Any number and/or any form of the locking feature 30 that can connect the two half pieces 22 together, at least temporarily until the bushing assembly 10 is finally formed, may be used without departing from the scope of the present disclosure.

The locking feature 30 is optional and is used to provide a press-fit connection between the two pieces 22 so that the pieces 22 cannot be separated or fall out of the bushing assembly 10 during shipping and handling of the bushing assembly 10. When the bushing assembly 10 is mounted around a component of a vehicle by inserting a fastener of the component into the central bore 20 of the inner sleeve 12, the bushing assembly 10 is secured to the fastener of the component by other means and thus the two pieces 22 of the inner sleeve 12 cannot be separated or move in an axial direction of the fastener whether the locking feature 30 is used or not.

Referring to FIG. 5, each of the pieces 22 of the inner sleeve 12 includes an external shoulder 40 at the outer end portion 26. The external shoulder 40 extends radially from a cylindrical outer surface 42 of the half piece 22 such that a step is defined between the cylindrical outer surface 42 and the external shoulder 40. The external shoulder 40 may be an annular shoulder in one form and defines an inner axial face 44 extending in a radial direction and vertical to the cylindrical outer surface 42 and an outer radial face 46 extending in an axial direction and parallel to the cylindrical outer surface 42. A positional feature 48, which may be a cutout in one form, may be provided on the external shoulder 40 to provide an indication of the position and/or orientation of the locking feature 30.

Referring back to FIG. 4, when the two pieces 22 are placed in position and are optionally affixed together by the locking features 30, the cylindrical outer surfaces 42 and the inner axial faces 44 of the external shoulder 40 define a recessed area 50 for receiving the bearing 14 therein. The bearing 14 is rotationally mounted around the inner sleeve 12 and captured between the inner axial faces 44 of the external shoulders 40. The length of the recessed area 50 is approximately the length of the bearing 14. When the bearing 14 is assembled around the inner sleeve 12, the end faces of the bearing 14 abut the inner axial faces 44 of the external shoulders 40. Therefore, the axial movement of the bearing 14 in the central axis X is restrained by the external shoulders 40 of the pieces 22 of the inner sleeve 12.

The elastomeric bushing 16 is mounted around the bearing 14 and extends at least partially over the external shoulders 40 of the inner sleeve 12 such that the elastomeric bushing 16 contacts the inner axial faces 44 and the outer radial faces 46 of the external shoulders 40. A part of the elastomeric bushing 16 is disposed in the recessed area 50 defined between the external shoulders 40. The elastomeric bushing 16 includes annular ridges or beads 52 on an inner surface proximate the inner axial faces 44 of the external shoulders 40 and/or the outer radial faces 46 of the external shoulders 40 to increase the frictional contact and engagement between the inner surface of the elastomeric bushing 16 and the surfaces of the external shoulders 40.

The outer sleeve 18, which has a tubular/cylindrical shape, is mounted around the elastomeric bushing 16 and extends at least partially over the external shoulders 40. The outer sleeve 18 and elastomeric bushing 16 as shown extend over a majority of the external shoulders 40 in one form as illustrated herein. However, the overall length of the outer sleeve 18 and/or elastomeric bushing 16 could be shorter such that only a portion of the outer sleeve 18 and/or elastomeric bushing 16 extends over the external shoulders 40. In yet another form not shown, the outer sleeve 18 and the elastomeric bushing 16 may extend up to, or near, and not extend over the external shoulders 40. These and other variations of the lengths of the outer sleeve 18 and elastomeric bushing 16 should be construed as being within the scope of the present disclosure.

The external shoulders 40 of the inner sleeve 12 may be sized such that a space between the external shoulder 40 and the inner surface of the outer sleeve 18 is limited and such that the external shoulders 40 can also be used as a radial and/or conical displacement limiter for the elastomer bushing 16. For example, the external shoulders each define a width. At least one of the outer diameters and the widths of the external shoulders 40 are sized to radially and/or conically tune the elastomeric bushing.

In the present disclosure, the two-piece structure of the inner sleeve 12 allows the bearing 14 to be easily mounted around the inner sleeve 12 and between external shoulders 40, by inserting the half pieces 22 of the inner sleeve 12 into the bearing 14 from opposite ends of the bearing 14. When the pieces 22 are fully assembled, the axial movement of the bearing 14 is simultaneously restrained by the external shoulders 40. In other words, in order to properly mount the bearing 14 around the inner sleeve 12, the bushing assembly 10 of the present disclosure requires only one step of inserting the half pieces 22 into the bearing 14 from opposite ends while simultaneously restraining the axial movement of the bearing 14, as opposed to a typical bushing assembly, which requires a step of mounting a bearing around the inner sleeve and a step of affixing a retaining ferrule/ring at one or both ends of the inner sleeve to restrain axial movement of the bearing. Therefore, the bushing assembly 10 of the present application can save assembling time and the associated manufacturing costs.

In addition, the two-piece structure of the inner sleeve 12 allows one or more lip seals to be provided in combination with a labyrinth seal to be provided adjacent to the external shoulders 40 of the inner sleeve 12 for improved corrosion protection. The lip seal(s) may be rubber compression seal(s) on the inner axial faces 44 and/or the outer radial faces 46 of the external shoulders 40 to seal out contaminants. The design also provides a non-direct path from the outside to the bearing surface providing the additional labyrinth effect.

Further, this design also allows the two pieces 22 to be symmetrical so that the inner sleeve 12 may include two identical pieces to help reduce tooling costs and increase volumes. It is understood that the two pieces 22 may be made to have nonsymmetrical structures if a directional feature 48 should be added to only one of the half pieces 22.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A bushing assembly comprising:
an inner sleeve comprising two pieces, wherein each of the two pieces comprises a distal end portion and a proximal end portion, each of the proximal end portions comprising an external shoulder having an outer radial face and an inner axial face;
a bearing rotationally mounted around the inner sleeve and captured between each of the inner axial faces of the external shoulders;
an elastomeric bushing disposed around the bearing and in frictional contact with the outer radial faces of the external shoulders to resist movement between the elastomeric bushing and the inner sleeve; and
an outer sleeve disposed around the elastomeric bushing and extending at least partially over the external shoulders.

2. The bushing assembly according to claim 1, wherein the elastomeric bushing comprises beads proximate the outer radial faces of the external shoulders.

3. The bushing assembly according to claim 1, wherein the elastomeric bushing abuts the inner axial faces of the external shoulders.

4. The bushing assembly according to claim 3, wherein the elastomeric bushing comprises beads proximate the inner axial faces of the external shoulders.

5. The bushing assembly according to claim 1, wherein each of the two pieces of the inner sleeve are symmetrical.

6. The bushing assembly according to claim 1, wherein each of the two pieces of the inner sleeve are asymmetrical.

7. The bushing assembly according to claim 6, wherein each of the two pieces of the inner sleeve comprise a locking feature.

8. The bushing assembly according to claim 7, wherein one of the two pieces of the inner sleeve comprises an axial tab at its distal end portion and the other piece of the inner sleeve comprises an axial recess at its distal end portion, wherein the axial tab is press fit into the axial recess to form the locking feature.

9. The bushing assembly according to claim 1, wherein the inner sleeve comprises a locking feature configured to secure the two pieces together.

10. The bushing assembly according to claim 1, wherein the external shoulders each define a width and an outer diameter, wherein at least one of the outer diameters and the widths of the external shoulders are sized to radially and/or conically tune the elastomeric bushing.

11. A bushing assembly comprising:
an inner sleeve consisting of two pieces, wherein each of the two pieces comprises a distal end portion and a proximal end portion, each of the proximal end portions comprising an external shoulder having an outer radial face and an inner axial face;
a bearing rotationally mounted around the inner sleeve and captured between each of the inner axial faces of the external shoulders;
an elastomeric bushing disposed around the bearing and abutting the outer radial faces and the inner axial faces of the external shoulders; and
an outer sleeve disposed around the elastomeric bushing and extending at least partially over the external shoulders.

12. The bushing assembly according to claim 11, wherein the elastomeric bushing comprises beads proximate the outer radial faces of the external shoulders.

13. The bushing assembly according to claim 11, wherein the elastomeric bushing comprises beads proximate the inner axial faces of the external shoulders.

14. The bushing assembly according to claim 11, wherein each of the two pieces of the inner sleeve are symmetrical.

15. The bushing assembly according to claim 11, wherein each of the two pieces of the inner sleeve are asymmetrical.

16. The bushing assembly according to claim 15, wherein each of the two pieces of the inner sleeve comprise a locking feature.

17. The bushing assembly according to claim 16, wherein one of the two pieces of the inner sleeve comprises an axial tab at its distal end portion and the other piece of the inner sleeve comprises an axial recess at its distal end portion, wherein the axial tab is press fit into the axial recess to form the locking feature.

18. The bushing assembly according to claim 11, wherein the external shoulders each define a width and an outer diameter, wherein at least one of the outer diameters and the widths of the external shoulders are sized to radially and/or conically tune the elastomeric bushing.

19. A bushing assembly comprising:
an inner sleeve comprising two pieces, wherein each of the two pieces comprises a distal end portion and a proximal end portion, each of the proximal end portions comprising an external shoulder having an outer radial face and an inner axial face;
a bearing rotationally mounted around the inner sleeve and captured between each of the inner axial faces of the external shoulders;
an elastomeric bushing disposed around the bearing and abutting the outer radial faces and the inner axial faces of the external shoulders; and
an outer sleeve disposed around the elastomeric bushing and extending at least partially over the external shoulders,
wherein each of the two pieces of the inner sleeve comprise a locking feature.

* * * * *